United States Patent
Shivanna et al.

(10) Patent No.: US 11,487,588 B2
(45) Date of Patent: Nov. 1, 2022

(54) AUTO-SIZING FOR STREAM PROCESSING APPLICATIONS

(71) Applicant: Microsoft Technology Licensing, LLC, Redmond, WA (US)

(72) Inventors: Abhishek Shivanna, San Mateo, CA (US); Bharath Kumarasubramanian, Fremont, CA (US); Prateek Maheshwari, Sunnyvale, CA (US); Rayman Preet Singh, Santa Clara, CA (US); Samarth Shetty, Campbell, CA (US); Kartik Paramasivam, Sunnyvale, CA (US); Fan Xie, Sunnyvale, CA (US); Pawas Chhokra, Milpitas, CA (US); Sanil Jain, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 16/917,737

(22) Filed: Jun. 30, 2020

(65) Prior Publication Data
US 2021/0406086 A1    Dec. 30, 2021

(51) Int. Cl.
*G06F 9/46* (2006.01)
*G06F 9/50* (2006.01)

(52) U.S. Cl.
CPC .......... *G06F 9/5055* (2013.01); *G06F 9/505* (2013.01); *G06F 9/5016* (2013.01)

(58) Field of Classification Search
CPC ...... G06F 9/5055; G06F 9/5016; G06F 9/505; G06N 20/00
See application file for complete search history.

(56) References Cited

U.S. PATENT DOCUMENTS

| 10,148,592 B1 | 12/2018 | Pai et al. |
| 2013/0086273 A1 | 4/2013 | Wray et al. |
| 2019/0163536 A1* | 5/2019 | Parees .................. G06F 9/4881 |

OTHER PUBLICATIONS

"Apache Beam", Retrieved From: https://web.archive.org/web/20200428043743/https://beam.apache.org/, Apr. 28, 2020, 2 Pages.
(Continued)

*Primary Examiner* — Gregory A Kessler
(74) *Attorney, Agent, or Firm* — NDWE, LLP (57) ABSTRACT

Techniques are provided for automatically resizing applications. In one technique, policy data that indicates an order of multiple policies is stored. The policies include (1) a first policy that corresponds to a first computer resource and a first resizing action and (2) a second policy that is lower in priority than the first policy and that corresponds to a second resizing action and a second computer resource. Resource utilization data is received from at least one application executing in a cloud environment. Based on the order, the first policy is identified. Based on the resource utilization data, it is determined whether criteria associated with the first policy are satisfied with respect to the application. If satisfied, then the first resizing action is performed with respect to the application; otherwise, based on the computer resource utilization data, it is determined whether criteria associated with the second policy are satisfied.

17 Claims, 4 Drawing Sheets

(56) References Cited

OTHER PUBLICATIONS

"Apache Flink: Stateful Computations over Data Streams", Retrieved From: https://web.archive.org/web/20200428004042/https://flink.apache.org/, Apr. 28, 2020, 2 Pages.
"Apache Hadoop Yarn", Retrieved From: https://web.archive.org/web/20200427192311/https://hadoop.apache.org/docs/current/hadoop-yarn/hadoop-yarn-site/YARN.html, Apr. 27, 2020, 1 Page.
"Apache Kafka", Retrieved From: https://web.archive.org/web/20200428002307/https://kafka.apache.org/, Apr. 28, 2020, 1 Page.
"Apache Samza", Retrieved From: https://web.archive.org/web/20200428035438/http://samza.apache.org/, Apr. 28, 2020, 3 Pages.
"AWS Auto Scaling", Retrieved From: https://web.archive.org/web/20200428062120/https://aws.amazon.com/autoscaling/, Apr. 28, 2020, 3 Pages.
"Class MemoryUsage", Retrieved From: https://web.archive.org/web/20180328124012/https://docs.oracle.com/javase/7/docs/api/java/lang/management/MemoryUsage.html, Mar. 28, 2018, 3 Pages.
"Deep Learning for Java", Retrieved From: https://web.archive.org/web/20200413132224/https://deeplearning4j.org/, Apr. 13, 2020, 3 Pages.
"Event Hubs", Retrieved From: https://web.archive.org/web/20200424003411/https://azure.microsoft.com/en-us/services/event-hubs/, Apr. 24, 2020, 10 pages.
"Production-Grade Container Orchestration—Kubernetes", Retrieved From: https://web.archive.org/web/20200415024744/https://kubernetes.io/, Apr. 15, 2020, 5 Pages.
"RocksDB: Persistent Key-Value Store for Fast Storage Environments", Retrieved From: https://web.archive.org/web/20200415034424/https://rocksdb.org/, Apr. 15, 2020, 5 Pages.
"Samza—Windowing", Retrieved From: https://samza.apache.org/learn/documentation/1.0.0/container/windowing.html, Retrieved on: Jun. 22, 2020, 2 Pages.
"Samza SQL", Retrieved From: https://web.archive.org/web/20191119221546/https://samza.apache.org/learn/documentation/latest/api/samza-sql.html, Nov. 19, 2019, 3 Pages.
Abadi, et al., "TensorFlow: A System for Large-Scale Machine Learning", In Proceedings of 12th USENIX Symposium on Operating Systems Design and Implementation, Nov. 2, 2016, pp. 265-283.
Akidau, et al., "The Dataflow Model: A Practical Approach to Balancing Correctness, Latency, and Cost in Massive-Scale, Unbounded, Out-of-Order Data Processing", In Proceedings of the VLDB Endowment, vol. 8, No. 12, Aug. 31, 2015, pp. 1792-1803.
Bilal, et al., "Towards Automatic Parameter Tuning of Stream Processing Systems", In Proceedings of the 2017 Symposium on Cloud Computing, Sep. 24, 2017, pp. 189-200.
Bird, et al., "Pacora: Performance Aware Convex Optimization for Resource Allocation", In Proceedings of the 3rd USENIX Workshop on Hot Topics in Parallelism, May 26, 2011, 6 Pages.
Carbone, et al., "State Management in Apache Flink: Consistent Stateful Distributed Stream Processing", In Proceedings of the VLDB Endowment, vol. 10, Issue 12, Aug. 1, 2017, pp. 1718-1729.
Chen, et al., "Realtime Data Processing at Facebook", In Proceedings of the International Conference on Management of Data, Jun. 26, 2016, pp. 1087-1098.
Corbet, Jonathan, "Adding a Huge Zero Page", Retrieved From: https://lwn.net/Articles/517465/, Sep. 26, 2012, 4 Pages.

Dean, et al., "Dangers and Uses of Cross-Correlation in Analyzing Time Series in Perception, Performance, Movement, and Neuroscience: The Importance of Constructing Transfer Function Autoregressive Models", In Journal of Behavior Research Methods, vol. 48, Issue 2, Jun. 23, 2015, pp. 783-802.
Delimitrou, et al., "Quasar: Resource-Efficient and QoS-Aware Cluster Management", In Journal of ACM SIGPLAN Notices, vol. 49, Issue 4, Mar. 1, 2014, pp. 127-143.
Floratou, et al., "Dhalion: Self-Regulating Stream Processing in Heron", In Proceedings of the VLDB Endowment, vol. 10, Issue 12, Aug. 1, 2017, pp. 1825-1836.
Fu, et al., "DRS: Auto-Scaling for Real-Time Stream Analytics", In Journal of IEEE/ACM Transactions on Networking, vol. 25, Issue 6, Dec. 2017, pp. 3338-3352.
Gencer, et al., "Configuring Distributed Computations Using Response Surfaces", In Proceedings of the 16th Annual Middleware Conference, Dec. 7, 2015, pp. 235-246.
Handa, Sahil, "Defending Against Abuse at LinkedIn's Scale", Retrieved From: https://web.archive.org/web/20181210073113/https://engineering.linkedin.com/blog/2018/12/defending-against-abuse-at-linkedins-scale, Dec. 6, 2018, 3 Pages.
Hindman, et al., "Mesos: A Platform for Finegrained Resource Sharing in the Data Center", In Proceedings of the 8th USENIX Conference on Networked Systems Design and Implementation, Mar. 2011, 14 Pages.
Kalavri, et al., "Three Steps is all you need: Fast, Accurate, Automatic Scaling Decisions for Distributed Streaming Dataflows", In Proceedings of the 13th USENIX Symposium on Operating Systems Design and Implementation, Oct. 8, 2018, pp. 783-798.
Kulkarni, et al., "Twitter Heron: Stream Processing at Scale", In Proceedings of the ACM SIGMOD International Conference on Management of Data, May 31, 2015, pp. 239-250.
Lohrmann, et al., "Elastic Stream Processing with Latency Guarantees", In Proceedings of 35th International Conference on Distributed Computing Systems, Jun. 29, 2015, pp. 399-410.
Lorido-Botran, et al., "A Review of Auto-Scaling Techniques for Elastic Applications in Cloud Environments", In Journal of Grid Computing, vol. 12, Issue 4, Dec. 2014, 25 Pages.
Mai, et al., "Introducing AthenaX, Uber Engineering's Open Source Streaming Analytics Platform", Retrieved From: https://web.archive.org/web/20200414134624/https://eng.uber.com/athenax/, Oct. 9, 2017, 5 Pages.
McKittrick, "Overview of Autoscale with Azure Virtual Machine Scale Sets", Retrieved From: https://docs.microsoft.com/en-us/azure/virtual-machine-scale-sets/virtual-machine-scale-sets-autoscale-overview, May 29, 2018, 3 Pages.
Noghabi, et al., "Samza: Stateful Scalable Stream Processing at LinkedIn", In Proceedings of the VLDB Endowment, vol. 10, Issue 12, Aug. 1, 2017, pp. 1634-1645.
Venkataraman, et al., "Drizzle: Fast and Adaptable Stream Processing at Scale", In Proceedings of the 26th Symposium on Operating Systems Principles, Oct. 28, 2017, pp. 374-389.
Xu, et al., "Stela: Enabling Stream Processing Systems to Scale-in and Scale-out On-demand", In Proceedings of International Conference on Cloud Engineering (IC2E), Apr. 4, 2016, pp. 22-31.
Zaharia, et al., "Discretized Streams: An Efficient and Fault-Tolerant Model for Stream Processing on Large Clusters", In Proceedings of the 4th {USENIX} Workshop on Hot Topics in Cloud Computing, Jun. 12, 2012, 6 Pages.
"International Search Report and Written Opinion Issued in PCT Application No. PCT/US21/034681", dated Sep. 28, 2021, 12 Pages.

* cited by examiner

AUTO-SIZING FOR STREAM PROCESSING APPLICATIONS

TECHNICAL FIELD

The present disclosure generally relates to stream processing applications and, more particularly to, automatically sizing stream processing applications in a cloud environment.

BACKGROUND

Software programs (or "applications") execute most efficiently when there are sufficient computing resources available to the programs, such as memory and CPU. One approach to provisioning computer resources to an application is to allow an application developer to specify the quantity of each resource type that the application will use during execution. This approach can lead to over-provisioning or under-provisioning. An under-provisioned application will execute poorly as evidenced by decrease throughput and/or increased latency, or processing stalls causing hightail latency. For example, if an application is provisioned with relatively little memory, then the application might be constantly interrupted to wait for data to be swapped out of memory to make room for storing newly fetched data.

Regarding over-provisioning, while an over-provisioned application may run optimally, the cost of supporting that application increases and the application becomes expensive to maintain. Also, over-provisioning one application may result in other applications not having sufficient computer resources to execute optimally.

One approach to provisioning computer resources for cloud applications (or application that run or execute in the "cloud") is to implement a provisioning service that monitors performance of multiple applications and makes provisioning decisions based on the performance. (In modern cloud contexts, the number of distinct applications running in a single cloud may be hundreds or thousands.) Such dynamic provisioning of computer resources for an application is referred to as "resizing" the application. Thus, a "resizing" determination or decision results in a resizing action or no action.

There are multiple approaches to implementing a provisioning service, each of which is deficient in one or more ways. For example, one approach focuses on scaling parallelism for meeting applications' latency and throughput goals while modeling applications as a directed acyclic graph (DAG) of operators. However, production applications have diverged from this model in multiple ways causing them to have heterogeneous performance characteristics. For example, some applications use remote services, maintain state, use user-defined functions and external frameworks, and combine different functionalities. Consequently, only tuning the parallelism of an application without taking into account other sizing parameters, service dependencies, and environmental variables, typically leads to under-provisioned (or "under-sized") applications causing decreased throughput and increased latencies and processing stalls.

Another approach implements one or more sophisticated "hill climbing" optimization techniques to determine what resizing action to perform next, if any. However, such techniques are stochastic and, therefore, resizing actions for a cloud application at one time may be very different than the resizing actions for the cloud application at another time, even though the state of the cloud application may be identical during both times. Also, performing forensic analysis to determine the cause of a crash or degradation in performance of an application in such an environment is time consuming and challenging.

Another approach involves automatically attempting many different resizing actions until a performance problem disappears. Such an approach also involves issuing many undo actions if a performance problem persists in light of one or more resize actions. However, implementing a single resize action (and undoing the resize action) may take a significant amount of time to complete. Thus, this approach can result in wasting computing resources by issuing many unnecessary resize actions and corresponding undo actions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically resizing applications are provided. In one technique, an ordered set of policies is defined and implemented, each policy corresponding to a different computer resource. One of the policies corresponds to memory while a subsequent policy in the set corresponds to the central processing unit (CPU), which policy dictates how much of a CPU can be dedicated to executing the application. Thus, a resizing decision pertaining to CPU only occurs after a decision to not resize memory for an application. In a related technique, one of the policies corresponds to CPU while a subsequent policy corresponds to parallelism, which is the number of threads or cores assigned to an application. Thus, a resizing decision pertaining to parallelism of an application only occurs after a decision to not resize the CPU for the application.

In a related embodiment, a change in backlog of an application is measured using application checkpoints and the change is used to determine whether to resize a parallelism characteristic of the application, such as increasing the number of threads or creating another instance of the application.

In a related embodiment, the ordered set of policies include policies to scale down the provisioning of a computer resource. For example, downsizing memory precedes downsizing CPU and downsizing CPU precedes downsizing parallelism.

Embodiments improve computer-related technology by automatically resizing applications, thus, avoiding the under-provisioning and over-provisioning of computer resources that normally results when application developers specify provisioning parameters. Also, embodiments implement interpretable and deterministic decisions and avoid constant undo actions that are typical in other resizing solutions.

Stream Processing

Some types of applications are difficult to provision due to the nature of their tasks. One example of such an application is referred to as a stream processing application. "Stream processing" is the processing of "data in motion," or in other words, processing data directly as the data is produced or received. Much of modern data is produced as continuous streams: sensor events, user activity on a website, etc. Such data is created as a series of events over time.

Before stream processing, this data was often stored in a database, a file system, or other form of mass storage. Applications would query the data or compute over the data as needed. Stream processing turns this paradigm around: the application logic, analytics, and queries exist continuously and data flows through them continuously. Upon receiving an event from a data stream, a stream processing application reacts to that event by triggering an action, updating an aggregate or other statistic, or "remembering" that event for future reference. Streaming processing applications can also process multiple data streams jointly, and each computation over a data stream may produce other data streams.

Even though examples described herein relate to stream processing applications, embodiments are applicable to non-stream processing applications and workloads, such as batch or "online" web service workloads.

Example Cloud Service

Figure 1:
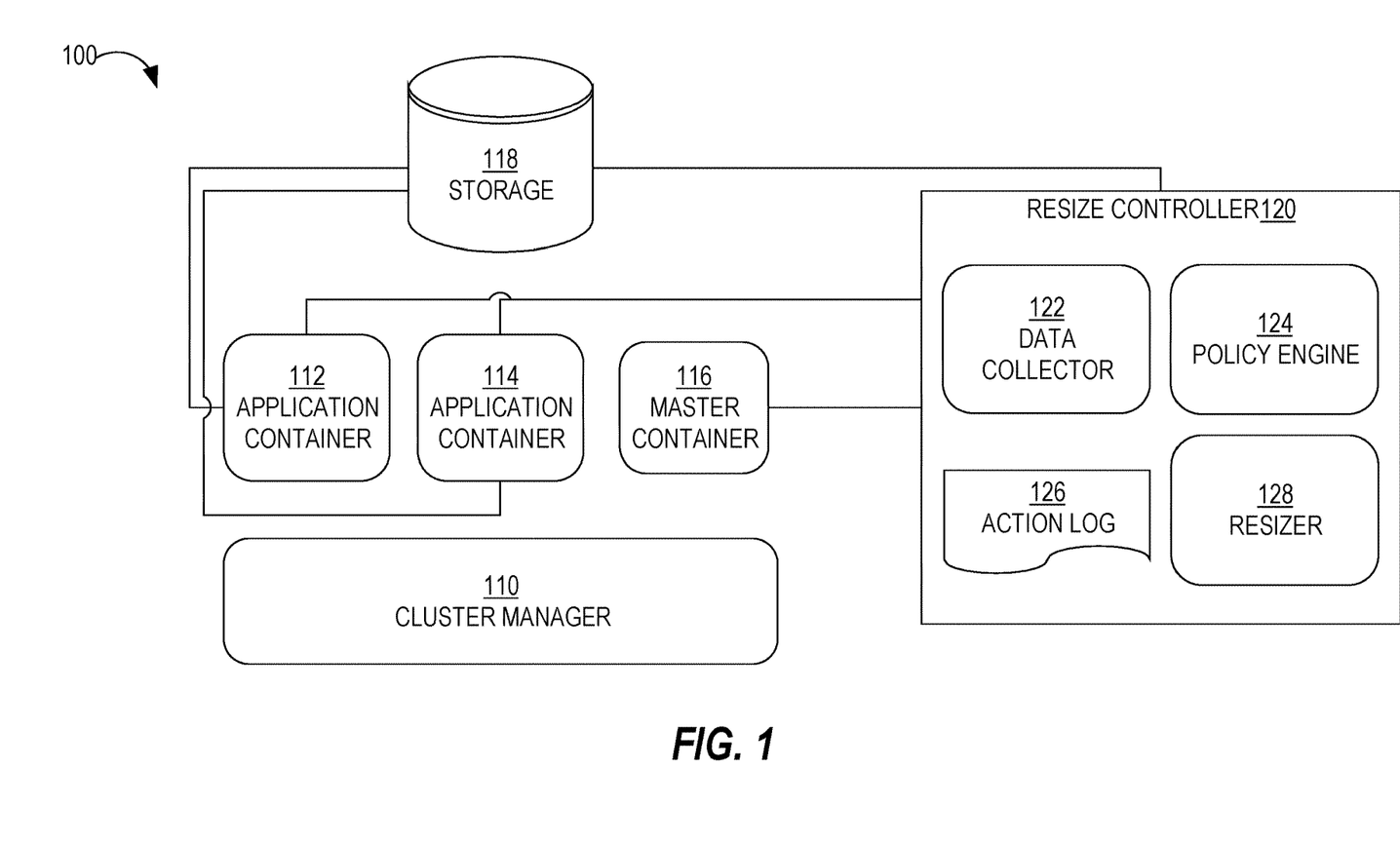
FIG. 1 is a block diagram that depicts an example cloud system for resizing applications in a cloud environment, in an embodiment.

FIG. 1 is a block diagram that depicts an example cloud system 100 for resizing applications in a cloud environment, in an embodiment. Cloud system 100 includes a cluster manager 110, application containers 112-116, storage 118, and a resize controller 120. Although only a single cluster manager 110 is depicted, cloud system 100 may include multiple cluster managers, each managing a different cluster of computing machines. Also, although only two non-master application containers are depicted, cloud system 100 may include many non-master application containers and multiple application master containers.

Cloud system 100 is a computing platform that hosts multiple (cloud) applications and runs multiple cloud services. A cloud service is a service that is made available to users on demand via the Internet from a cloud provider's servers as opposed to being provided from a company's own on-premises servers. Cloud services are designed to provide scalable access to applications, resources and services, and are typically fully managed by a cloud services provider. Examples of cloud services include online data storage and backup solutions, Web-based e-mail services, hosted office suites and document collaboration services, database processing, managed technical support services and more.

Cloud system 100 is provided by a cloud services provider, which may be private (in which case cloud system 100 hosts and runs only applications from a single organization) or public (in which case cloud system 100 hosts and runs applications from different entities or organizations). Examples of public cloud services providers include Microsoft Azure, Google Cloud, Amazon Web Services (AWS), and IBM Cloud.

Examples of (cloud) applications that cloud system 100 hosts include applications that generate notifications, applications that allow users to digitally edit an entity profile (e.g., a user profile or an organization profile), applications that detect duplication, fraud, or abuse, applications that compute a user selection rate, applications that monitor trust, and applications that perform (or generate data used in) electronic billing tasks.

An application may run in the context of a container. A container is a standard unit of software that packages code of an application (e.g., application binaries) and all its dependencies so that the application runs quickly and reliably from one computing environment to another. Containers are available for both Linux and Windows-based applications. Containerized software run the same, regardless of the infrastructure.

In an embodiment, multiple instances of a single application hosted by cloud system 100 execute simultaneously. Each instance of the application executes in the context of a container. Thus, multiple application containers may correspond to the same application, executing the same logic.

A non-master application container (such as application container 112) is the main processing unit of an application. A master application container (such as master application container 116) acts as a coordinator of non-master application containers. Each non-master application container periodically sends, to a master application container, a heartbeat (or keep alive) message that indicates that the non-master application container is still operating. If the master application container does not receive a heartbeat message from a non-master application container, then the master application container instructs cluster manager 110 to instantiate a new non-master application container in place of the "silent" non-master application container.

Each of non-master application containers 112-114 generates output, which is stored in storage 118. Storage 118 may be persistent storage or non-persistent storage. Examples of output that application containers 112-114 generate include a result of processing an event or message from an event/message queue, a new event that pertains to a topic to which one or more other ("downstream") applications subscribe, writes to databases, and messages to one or more message queues, cloud storage services, logging services, notification services (e.g., to send users email, mobile notifications, etc.), and other web services.

In addition to starting up non-master application containers, cluster manager 110 performs bookkeeping tasks, such as keeping track of the number of containers on each machine, which machines have extra capacity, and which machines have low capacity. Based on the capacity of each of multiple machines in cloud system 100, cluster manager 110 assigns specific application containers to specific machines in cloud system 100. Each application container maps to a set of resources (e.g., CPU, memory, etc.) and cluster manager 110 performs bookkeeping about these resource allocations on different machines. Assigning application containers to machines may involve starting up a new application container on a machine in cloud system 100 or moving an existing application container to another machine in cloud system 100.

Cluster manager 110 also receives resource allocation instructions from a master application container, such as an instruction to allocate ten GB of memory to one application container and another instruction to allocate 50% of a CPU to each of six other application containers. In response to receiving resource allocation instructions from a master application container, cluster manager 110 allocates the specified resource amounts to the specified application containers.

Resize Controller

Resize controller 120 comprises a data collector 122, a policy engine 124, an action log 126, and a resizer 128. Each of data collector 122, policy engine 124, and resizer 128 is implemented in software, hardware, or any combination of software and hardware. Some of these elements of resize controller 120 may be implemented in a single program or may be distributed among multiple programs. Regardless of the distribution of the tasks that resize controller 120 performs and the number of programs that implement those tasks, resize controller 120 may execute on one or multiple machines of cloud system 100.

Data collector 122 receives computer resource utilization data from one or more data sources, such as storage 118 and non-master application containers 112 and 114. Examples of computer resource utilization data include an amount of memory that an application container is currently using, a percentage of a CPU that an application container is using, a number of events or messages that have been received for an application, and a specific event or message that an application container has recently processed.

Data collector 122 may calculate additional computer resource utilization data based on resource utilization data that it has received from one or more data sources. For example, as described in more detail below, data collector 122 calculates a backlog based on the current "last" offset of an input stream, and a checkpointed offset of the application on that input stream. Another example of data that data collector 122 calculates is aggregated utilization on per-application basis, such as by computing a runtime max of datapoints from all containers of an application (for a given timestamp).

In order to aggregate utilization data from multiple application containers on a per-application basis, data collector 122 receives utilization data from application containers 112-114 and stores the utilization data in association with the respective application container, for example, using metadata that uniquely identifies each application container. Data collector 122 stores the organized data in temporary storage (not depicted).

Data collector 122 may execute continuously such that data collector 122 regularly (e.g., every few seconds or every minute) retrieves (e.g., requests) data from the one or more data sources. Additionally or alternatively, one or more data sources send (or "push") data to data collector 122. For example, a data source acts as a publisher of data that pertains to a particular topic and data collector 122 acts as a subscriber of data that pertains to the particular topic. Data collector 122 is said to "listen" to the particular topic. A central publish-subscribe service (not depicted) routes published data to subscribers of that data. An example of a stream processing software platform is Apache Kafka. In this example, application containers 112-114 emit beacons of data (e.g., each minute) to the central publish-subscribe service and data collector 122 consumes those beacons of data.

Policy engine 124 accesses the organized data and determines whether a resizing action should be implemented for a particular application relative to a particular computer resource. Such a determination is based on policy data that comprises a set of policies that are ordered based on priority. Each policy in the set of policies corresponds to a computer resource, indicates an action (increase (or scale up) or decrease (or scale down) of the corresponding computer resource), and one or more metrics that are used to determine whether to initiate the action. Examples of computer resources include heap, memory, CPU (central processing unit), parallelism, RDMA (remote data memory access), and GPU (graphics processing unit).

In an embodiment, data collector 122 aggregates container level utilization data on a per application basis and policy engine 124 makes decisions, based on the aggregated utilization data, on a per application basis. This may be because the problem of a few containers of an application being significantly more resource intensive than other containers of the application is relatively rare. However, in another embodiment, policy engine 124 is extended to use bookkeeping on a per-container basis and makes decisions on a per-container basis.

Policy Initiation Criteria

Each policy is associated with one or more initiation criteria that, if satisfied, would cause the action corresponding to the policy to be triggered or initiated. The initiation criteria for different policies may be specified by a user or administrator of resize controller 120.

The one or more initiation criteria may vary from one policy to another policy depending on the type of computer resource. Different initiation criteria involve different metrics. For example, for memory, an initiation criterion may be 95% usage of memory that has been allocated to the application. Thus, if an application is currently using more than 95% of the memory that has been allocated to the application, then the initiation criterion is satisfied and the corresponding action is triggered. As another example, for CPU, an initiation criterion may be 90% usage of a CPU that have been allocated to the application. Thus, if an application is currently using more than 90% of the CPU that has been allocated to the application, then the initiation criterion is satisfied and the corresponding action is triggered. As another example, for parallelism, an initiation criterion may be an increase in backlog of greater than 5% over a certain period of time. Thus, if the backlog associated with an application increased more than 5% relative to a previous point in time, then the initiation criterion is satisfied and the corresponding action is triggered.

A particular application container may execute on a computing device (e.g., a server) that hosts one or more other application containers. Thus, the particular application container shares the memory resource of the computing device with the other application container(s). For example, each of three application containers may have been allocated 33% of the total memory of the computing device. Thus, a 95% usage of memory threshold may translate to approximately 31% of the total memory of the computing device.

In an embodiment, a policy is associated with multiple initiation criteria. For example, for a policy related to increasing heap memory, the multiple initiation criteria may be based on amount of heap currently used by the application, the (e.g., average or median) time to perform garbage collection over a period of time, and the number of times garbage collection was invoked during that period of time.

One or more of the multiple initiation criteria may be taken into account when determining whether to perform the action associated with the policy. For some policies with multiple initiation criteria, only one of the initiation criteria needs to be satisfied in order to trigger the corresponding action, whereas for other policies with multiple initiation criteria, all (or multiple) of the initiation criteria need to be satisfied in order to trigger the corresponding action. As an example of the former scenario in the heap context, if the number of times garbage collection is invoked for an application during a period of time is greater than N, then the corresponding action is triggered, even though the amount of heap used by the application is relatively low and, therefore, does not satisfy the initiation criterion that corresponds to the amount of heap used. As an example of the latter scenario in the heap context, in order to trigger an action for an application, then the amount of heap used by the application must be greater than a certain percentage allocated to the application, the number of times garbage collection is invoked is greater than N, and the average time that garbage collection takes on each invocation is greater than T (e.g., in milliseconds).

Ordered Set of Policies

The following is a table that lists policies that policy engine 124 applies to different applications or application containers.

TABLE A

| Priority | Computer Resource | Action | Metrics |
|---|---|---|---|
| P1 | Heap | Increase/Scale up | Heap used, GC-time, GC count |
| P2 | Memory | Increase/Scale up | Memory used |
| P3 | CPU | Increase/Scale up | CPU used |
| P4 | Parallelism | Increase/Scale up | Backlog |
| P5 | Heap | Decrease/Scale down | Heap committed |
| P6 | Memory | Decrease/Scale down | Memory used |
| P7 | CPU | Decrease/Scale down | CPU used |
| P8 | Parallelism | Decrease/Scale down | Backlog |

In the example of Table A, "heap" and "memory" are two different types of computer resources. Other embodiments might not have separate policies for different types of memory. "Heap" is a specific type of memory and "memory" may refer to only non-heap memory or to heap memory and other types of memory, such as stack memory and buffer memory. Heap memory is memory that may be allocated at random access. Unlike stack memory where memory is allocated and released in a very defined order, individual data elements allocated on the heap are typically released in ways which are asynchronous from one another. While this example includes multiple types of memory, other examples might not distinguish between different types of memory.

In the example of Table A, physical resource allocations are analyzed (P1-P3) before a logical resource allocation (P4). Physical resource allocations (e.g., heap, memory, CPU, GPU, RDMA-capabilities, and NVRAM) may be considered properties of the environment while the logical resource allocation (i.e., parallelism) may be considered a property of the application. (Another example of a logical resource allocation includes request-rate-limits for a remote service that an application may be using, such as cloud storage, a notification service, or other web services.) Once it is determined that properties of the environment are not the problem, then the property of the application is examined.

Processing Policies in Priority Order

In an embodiment, policy engine 124 considers the highest priority policy first (e.g., P1 in Table A) before considering any other policy in the set of policies. Policy engine 124 only considers the second highest priority policy (e.g., P2 in Table A) if policy engine 124 determines that the one or more initiation criteria of the highest priority policy are not satisfied (or, in other words, that the action associated with the highest priority policy should not be performed). Thus, before considering the lowest priority policy (e.g., P8 in Table A), policy engine 124 first determines that none of the actions associated with the other policies should be performed. In this way, resizing decisions are interpretable and deterministic rather than made at random.

In a related embodiment, if policy engine 124 determines that the action of a particular policy should be performed, then policy engine 124 does not consider any policy that succeeds the particular policy in priority order before considering any policies that are higher in priority than the particular policy and the particular policy itself. Thus, the next policy that policy engine 124 considers at some future time is the highest priority policy (e.g., P1 in Table A).

Figure 2A:
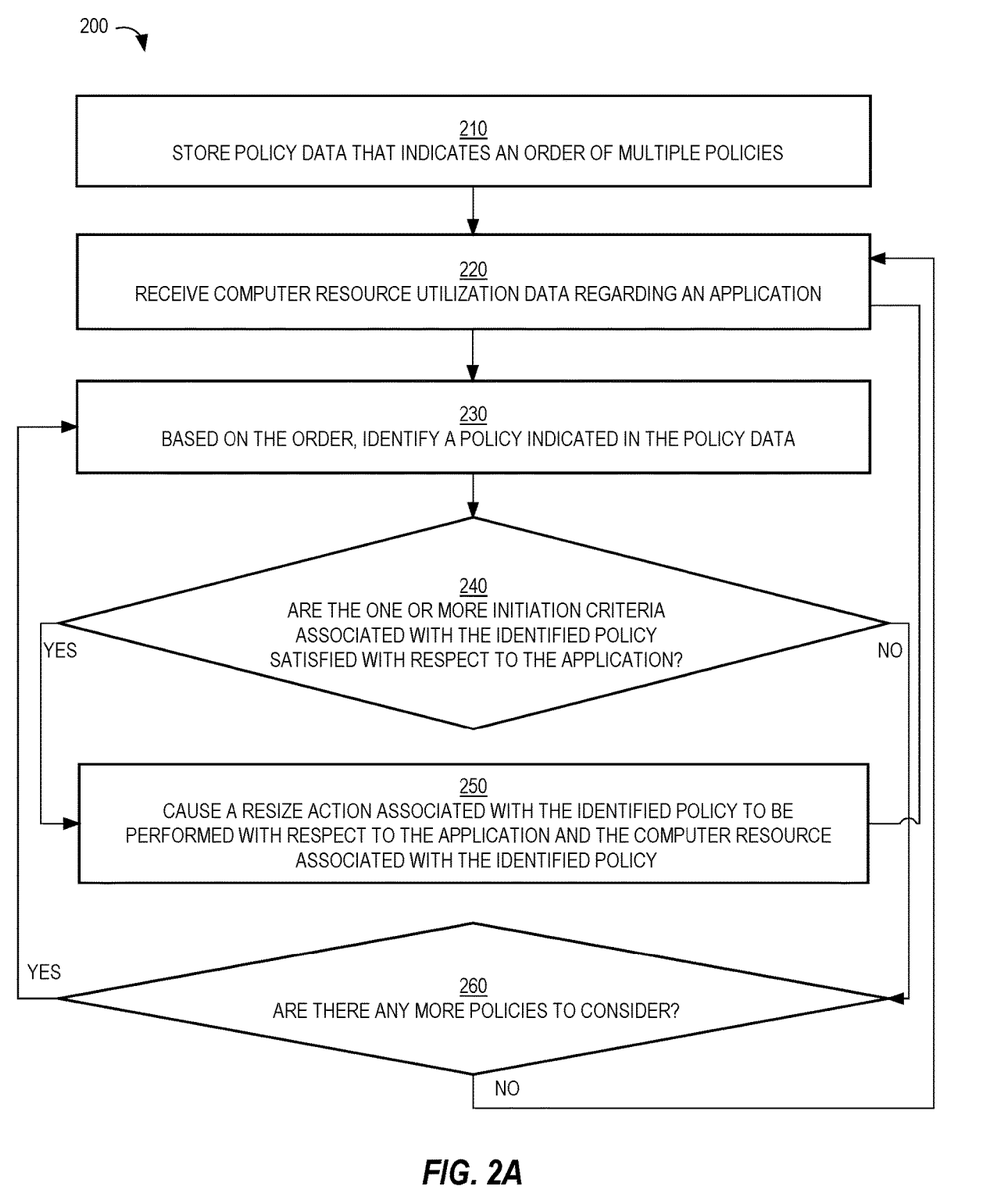
FIG. 2A is a flow diagram that depicts an example process for resizing applications in a cloud environment, in an embodiment.

FIG. 2A is a flow diagram that depicts an example process 200 for resizing applications in an cloud system, in an embodiment. Process 200 may be implemented by one or more components of resize controller 120.

At block 210, policy data is stored that indicates an order of multiple policies. The policy data is accessible to policy engine 124. The initiation criteria and any resizing action rules that dictate a new resource allocation for an application may be specified by a user or administrator of cloud system 100.

In a related embodiment, different sets of policy data may be specified for different sets of applications. For example, the computer resource allocations for one set of applications may be dictated by one set of policy data while the computer resource allocations for another set of applications may be dictated by another set of policy data.

At block 220, computer resource utilization data regarding an application executing in cloud system 100 is received. The computer resource utilization data may include (1) utilization data indicating specific computer resources that the application is currently utilizing and (2) backlog data indicating a number of events or messages that are pending for the application, which is described in more detail below. Block 220 may be performed by data collector 122 and may be performed continuously while subsequent blocks of process 200 are being performed.

At block 230, based on the order indicated in the policy data, a particular policy is identified. The particular policy corresponds to a particular computer resource. If this is the first time that block 230 is performed, then the identified policy is the highest priority policy indicated in the policy data. Given the example in Table A, policy P1 is identified.

At block 240, based on the computer resource utilization data, it is determined whether one or more initiation criteria associated with the identified policy are satisfied with respect to the application. For example, if the computer resource of the identified policy is heap, then initiation criteria may be whether the current heap utilization by the application is greater than 90% of the current heap allocation to the application and whether the average garbage collection time is greater than ten milliseconds. If the one or more initiation criteria are satisfied, then process 200 proceeds to block 250. Otherwise, process 200 proceeds to block 260.

At block 250, a resizing action is caused to be performed with respect to the application and the particular computer resource. For example, resizer 128 sends, to master application container 116, an instruction to resize a particular application or application container. The instruction indicates a computer resource (e.g., heap memory), a particular application or one or more application containers, and a new allocation amount (e.g., ten gigabytes). Thereafter, policy engine 124 does not analyze or consider a subsequent policy to the first policy until policy engine 124 determines that the one or more first initiation criteria associated with the first policy is not satisfied.

If block 250 is performed, then process 200 returns to block 220, where additional computer resource utilization data is received. The next iteration of block 230 will involve identifying the highest priority policy from the policy data. A certain period of time may elapse before performing that next iteration of block 230. That period of time is when the resize action can take effect. After the period of time, it will be determined whether the resize action addressed the under (or over) utilization issue that caused the one or more initiation criteria in the most recent iteration of block 240 to be satisfied.

At block 260, it is determined whether there are any more policies indicated in the policy data. If so, then process 200 returns to block 230, where another policy is identified, a policy that is subsequent to the policy identified most recently in block 230. For example, policy engine 124 identifies, in a second iteration of block 230, policy P2 from Table A. If process 200 proceeds to block 260, then a resize action associated with the policy identified most recently in block 230 is not caused to be performed, at least during this iteration of process 200.

If the determination in block 260 is negative, then process 200 may wait to return to block 220 where additional computer resource utilization data is obtained. Block 220 may be invoked automatically at another time in the future. For example, after considering all the policies in the stored policy data and determining that no resizing action is to be performed, policy engine 124 may wait a few seconds or one minute to allow for additional computer resource utilization data to be retrieved (at block 220) and the highest priority policy is identified again (at block 230).

Specific Examples of Prioritizing Computer Resources

Even if there is sufficient total memory for an application, an insufficient amount of heap memory will cause performance issues. For example, the smaller the heap memory, the more often garbage collection will be invoked and the longer each instance of garbage collection will take to complete. The more CPU resources devoted to garbage collection, the less CPU resources are available for other processing. Therefore, in an embodiment, a policy related to heap is prioritized before a policy related to memory, or total memory. Also, in a related embodiment, a policy related to memory is prioritized before a policy related to CPU. Thus, the policy related to CPU is only considered after determining that an action associated with the policy related to memory should not be performed.

In an embodiment, a policy related to CPU is prioritized before a policy related to parallelism. Thus, the policy related to parallelism is only considered after determining that an action associated with the policy related to CPU should not be performed. If policy engine 124 considers parallelism actions before CPU actions, then there is a relatively high likelihood that policy engine 124 would make sub-optimal resizing actions. For example, a resizing action that increases parallelism action might not address an underlying performance issue that affects CPU usage. Therefore, time and computing resources would be wasted increasing parallelism.

Resizing Computer Resources

Once policy engine 124 determines that a computer resource (e.g., memory, parallelism) for an application is to be resized (either an increase or a decrease, policy engine 124 (or another component of resize controller 120) determines a new resource allocation for the application. Such a determination may be performed in one or more ways.

In an embodiment, resize controller 120 implements one or more rules about how much to increase (or decrease) a current allocation of an application for a particular computer resource. As a specific example, one rule may be to double the current memory allocation of an application. Thus, if the current memory allocation is ten gigabytes, then the new memory allocation would be twenty gigabytes. As a related example, another rule may be to quadruple the current memory allocation of an application if a positive resize action was performed for the application within the last two minutes. Such an increase in the rate at which memory is allocated avoids incremental resize actions in case the application is experiencing a significant increase in arrival rates or in the number of requests to the application.

An example of a rule for resizing parallelism for an application is increasing the current number of threads allocated to the application by 50%. The current number of threads may be determined by multiplying the number of containers by the number of threads for container. If the new thread allocation violates a per container thread limit (e.g., 16 threads per container), then one or more new containers for the application are instantiated and executed, where the new total number of containers for the application and the new number of threads for the application does not violate the per container thread limit. If it is determined that one or more new application containers should be instantiated, then the amount of allocation for other types of computer resources (e.g., memory and CPU) for those new application containers either may be kept the same as the resource allocation amount of one or more existing application containers or may be a minimum allocation amount, such as one gigabyte of memory and 10% of CPU.

In an embodiment, each resizing action is recorded in log 126. Log 126 may be used in future resizing decisions. For example, if an application received an increase in memory allocation of 2× the last time policy P2 was considered and policy engine 124 determines that utilization of the current memory allocation is at 100%, then policy engine 124 may determine that memory allocation should increase 4×.

In an embodiment, resizer 128 implements resizing actions and communicates specific resizing instructions to master application container 116. A purpose of resizer 128 is to enforce cloud system limits so that an application does not consume all the computer resources of a particular type in a machine cluster of cloud system 100 or in the entirety of cloud system 100. If there is an error in logic of policy engine 124 or of data collector 122, then such an error may result in making unrealistic resize decisions. Resizer 128 may prevent such unrealistic resize decisions from overwhelming cloud system 100.

Thus, given a "global" resize amount for an application (e.g., a new memory allocation or a new thread count), resizer 128 determines, based on certain constraints, a new resource configuration for each application container. Examples of constraints to ensure that resize decisions do not overwhelm cloud system 100 or portions thereof include per machine limits, per container limits, and per application limits. Examples of per machine limits include an amount of network traffic caused by containers on that machine, a total number of threads on the machine amortized over the number of cores on the machine.

Examples of per container limits include a limit on the amount of memory that can be allocated to each container, a limit on the amount of a CPU that can be allocated to each container, and a limit on the number of threads that can be allocated to each container.

Examples of per application limits include a limit on the amount of memory that can be allocated to an application and a limit on the amount of a CPU that can be allocated to an application, and a limit on the number of threads that can be allocated to an application. Different applications may have different application limits. For example, some applications may have higher memory limits than other applications. Each type of limit (whether machine, container, or application) may be a default value and/or configurable.

In a related embodiment, if a limit is reached, then resizer 128 generates an error message and causes the error message to be persistently stored and transmitted to one or more destinations, such as in a form of a text message, an email message, or an alert that is presented on a computer resource dashboard that presents current resource usage statistics of cloud system 100 at one or more levels of granularity, such as at a machine cluster level, an application level, a container level, or an individual machine level.

Resizing Computer Resources and Machine Learning

In a related embodiment, resize controller 120 uses a machine-learned model to determine a new allocation of an application for a particular computer resource. The machine-learned model may have been trained, using one or more machine learning techniques, based on past performance of applications executing in cloud system 100.

Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with users and regions. The statistical model is trained based on multiple attributes described herein. In machine learning parlance, such attributes are referred to as "features." To generate and train a statistical prediction model, a set of features is specified and a set of training data is identified.

Embodiments are not limited to any particular machine learning technique for generating a machine-learned model. Example machine learning techniques include linear regression, logistic regression, random forests, naive Bayes, and Support Vector Machines (SVMs). Advantages that machine-learned models have over rule-based models include the ability of machine-learned prediction models to capture non-linear correlations between features and the reduction in bias in determining weights for different features.

A machine-learned model may output different types of data or values, depending on the input features and the training data. For example, training data may comprise, for each past resizing action, multiple feature values, each corresponding to a different feature of cloud system performance. In order to generate the training data, information about application performance during (or immediately before) each past resizing is analyzed to compute the different feature values.

Initially, the number of features that are considered for training may be significant. After training and validating a model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features with little predictive power may be removed from the training data. Removing such features can speed up the process of training future models and making resizing actions.

Application performance may be reflected in data collected by data collector 122 or by another component of cloud system 100. The output of a machine-learned model may vary from one implementation to another and varies depending on the computer resource for which the machine-learned model is computing a new resource allocation, which is described in more detail below.

Examples of features of a machine-learned model include a number of operations of an application of a certain type (e.g., map, filter, join), a number of operations of the application that are stateful, a current memory usage relative to the current memory allocation (e.g., 95%), a log of the current memory allocation, a number of pending requests for the application, a relative change in the number of pending requests since a previous point in time, a relative change in the number of requests that the application has processed since a previous point in time. Examples of a previous point in time include the last time a resizing event occurred for the application and the last time the initiation criteria for a policy was considered.

"Stateful" operations are operations that require an application to maintain state in order to complete the operation. Stateful operations are more likely to be more resource intensive (e.g., memory resource intensive) than stateless operations. An example of a stateful operation is a join and an example of a stateless operation is filter.

In a related embodiment, applications (executing in cloud system 100) are clustered based on one or more clustering criteria and a different machine-learned model is trained and used for each cluster. Examples of clustering criteria include the number of stateful operations the applications execute and/or the number of requests the applications receive in a period of time.

In a related embodiment, a machine-learned model is trained and used for individual applications. For example, machine-learned model A is trained based on performance data from application A and used to make resizing decisions for application A (and, potentially, for future versions of cloud application A), while machine-learned model B is trained based on performance data from application B and used to make resizing decisions for application B.

In an embodiment, a machine-learned model is trained and used to determine a resize amount for at least one computer resource (e.g., memory) and one or more rules are used to determine a resize amount for at least one other computer resource (e.g., CPU)

Resizing Memory

In an embodiment, a machine-learned model is trained and used to compute a new allocation of memory for an application. The output of such a machine-learned model may vary from one implementation to another. Examples of such output include an actual new memory allocation, a log of the actual new memory application, an absolute change (increase or decrease) in memory allocation compared to the current memory allocation (e.g., an increase of ten gigabytes or a decrease of five gigabytes), or a relative change in memory allocation (e.g., +37% or −22%). A relative change in memory allocation is useful in cloud environments where the memory allocation varies greatly from one application to another.

In a related embodiment, a single machine-learned model outputs a set of allocations for a particular application. Thus, the output comprises multiple resource allocations, each for a different type of computer resource, such as memory, heap, CPU, etc. The training data for such a machine-learned model is obtained by leveraging hand-tuned applications to ensure the allocations are accurate. Because the model is a prediction model, its accuracy may be measured by using standard metrics, such as root-mean-square-error (RMSE) and other accuracy metrics that penalize under-provisioning more than over-provisioning (e.g., weighted RMSE).

In an embodiment where different policies are stored for different types of memory (e.g., heap memory and total memory), a first machine-learned model is trained and used to determine a new allocation for a first type of memory and a second machine-learned model is trained and used to determine a new allocation for as second type of memory. In this embodiment, one of the inputs to the second machine-learned model may be the current allocation for the first type of memory. In other words, the current allocation for the first type of memory is a feature of the second machine-learned model. For example, if the current allocation of heap memory is five gigabytes, then five gigabytes is an input to the second machine-learned model that is used to determine a new allocation for total memory.

Parallelism and Backlog

In an embodiment, one metric used to determine whether to increase or decrease parallelism for an application is backlog of the application. "Backlog" of an application refers to an amount of work that is waiting for the application to perform. Backlog of an application may be measured in terms of the number of messages (e.g., including requests) or events that cloud system 100 has received for the application but that the application has not yet processed. For example, if cloud system 100 has received 98 events that an application has subscribed to and the application has processed two of the 98 events, then the backlog is 96. Alternatively, backlog may be measured based not only on the number of messages or events, but also on the type of messages or events. For example, some types of events may take longer to process (e.g., on average) than other types of events. Thus, one thousand events of type A may take just as long for an application to process as three events of type B.

One way to measure backlog is leveraging (1) a checkpoint written by an application (e.g., to storage 118 or to an event processing platform (e.g., Kafka) and (2) end-of-stream data that indicates the most recent event or message that is destined for the application or application container. The end-of-stream data may be accessible to data collector 122 through a metadata service of an event processing platform (e.g., Kafka). The end-of-stream data may be different than a buffer that is local to the application or application container. A separate process may place, in a local buffer, events or messages that have been queued (e.g., on a per topic basis) by the event processing platform. An application may access the local buffer directly in order to obtain the next event or message for processing. In this way, the application is not required to send a separate request to the event processing platform for each event/message that is destined for the application, which would increase event/message retrieval latency.

The checkpoint written by an application may be in storage 118 (which is accessible to data collector 122) or may be a message with a certain topic on which the application publishes using the event processing platform. The checkpoint is used by data collector 122 to determine the latest event/message that has been processed by the application. The checkpoint may include a first value (e.g., number) that uniquely identifies the most recent event/message that the application fully processed. The end-of-stream data may include a second value that uniquely identifies the most recent event/message that cloud system 100 has received for the application. A difference between the second value and the first value indicates a number of events/messages that cloud system 100 has received for the application but that have not yet been processed by the application.

In an embodiment, a policy for parallelism includes one or more initiation criteria, each of which is based on a single measurement of backlog. For example, if backlog is one thousand messages, then increase parallelism by 2×; if backlog is ten thousand messages, then increase parallelism by 4×.

However, a single measurement of backlog for an application might not yield enough information to determine whether to increase or decrease parallelism for the application. Thus, in an embodiment, a change in backlog is determined and used to determine whether to trigger an action of a policy associated with parallelism. For example, at time T1, the backlog for an application might be 43 and, at time T2, the backlog for the application might be 45. An increase of two (or 5%) might not be sufficient grounds to increase parallelism. However, a 10% increase in backlog might trigger a 25% increase in parallelism, while a 30% increase in backlog might trigger a 2× increase in parallelism.

Initiation criteria for increasing backlog may include absolute change, percentage change, and/or absolute size. For example, even though an increase of backlog over a period of time is only 5%, if the size of the backlog is greater than N, then an increase parallelism action is triggered.

Correlating Performance Issues of a Remote Service with Application Performance Issues Some applications, as part of their logic, might communicate with a remote service either asynchronously or synchronously. Examples of remote services include a remote web service, a remote BLOB (binary large object) storage, and a remote KV (key value) storage. One issue with remote services is that remote services might fail or their performance might degrade. For example, a remote service might not respond with data that an application is requesting. As another example, the number of queries per second (QPS) that a remote service might support may decrease 50%. As another example, a computer network that communicatively connects cloud system 100 with the remote service may begin dropping 5% of packets. As another example, the average latency of the remote service may increase from one millisecond to eight milliseconds. As a result of any of these performance degradations, the latency of the application will increase.

In response to an increase in latency of an application, resize controller 120 might increase the allocation of CPUs to the application or increase parallelism by initiating new instances of the application. Not only will these resizing actions not address the remote service problem, these resizing actions might degrade the remote service's performance by sending even more requests to the remote service.

In an embodiment, performance of a remote service is correlated with performance of an application. If the two performances are degrading and are correlated, then it is likely that the remote service is the cause of the performance problems of the application. In this case, instead of considering certain policies, those policies are skipped. For example, policy engine 124 "turns off" policies related to CPU and parallelism (and, thus, not considering those policies) while keeping policies related to heap and memory "turned on" (and, thus, considering those policies).

Performance of a remote service may be determined in one or more ways. For example, an application that causes a request to be transmitted to the remote service may receive a response that the request did not reach the remote service. The application may record a number of times such failures occurred over a period of time. As another example, an application may record an amount of time that elapsed between transmitting a request to the remote service and receiving a response from the remote service. The application (or another computing element) may calculate the difference, indicating a measurement of latency of each request-response pair. Tracking the latency of individual request-response pairs over time may reveal an increasing latency associated with the remote service. As another example, a remote service may report, to an application, a level of service that the remote service is currently providing. The level of service may be in any form, such as a value on a scale of 0 to 10, a latency value, or a QPS value. Based on the level of service, the application (or policy engine 124) may determine when the remote service is performing poorly.

One way for resize controller 120 to correlate performance of a remote service with performance of an application is to track a percentage change of performance of each of one or more computer resources by the application over a period of time and compute a percentage change of the performance of the remote service over the same period of time. A statistical measure of correlation based on both sets of performance data may be computed that reflects a level of correlation. Examples of correlation measures include time-lagged cross-correlation and stepwise regression. Additionally, the performance of the application may be shifted later in time relative to the performance of the remote service since the former typically lags the latter, especially if there is a cause-effect relationship. Such shifting of the performance data in time can produce a stronger and more reliable measure of correlation.

Figure 2B:
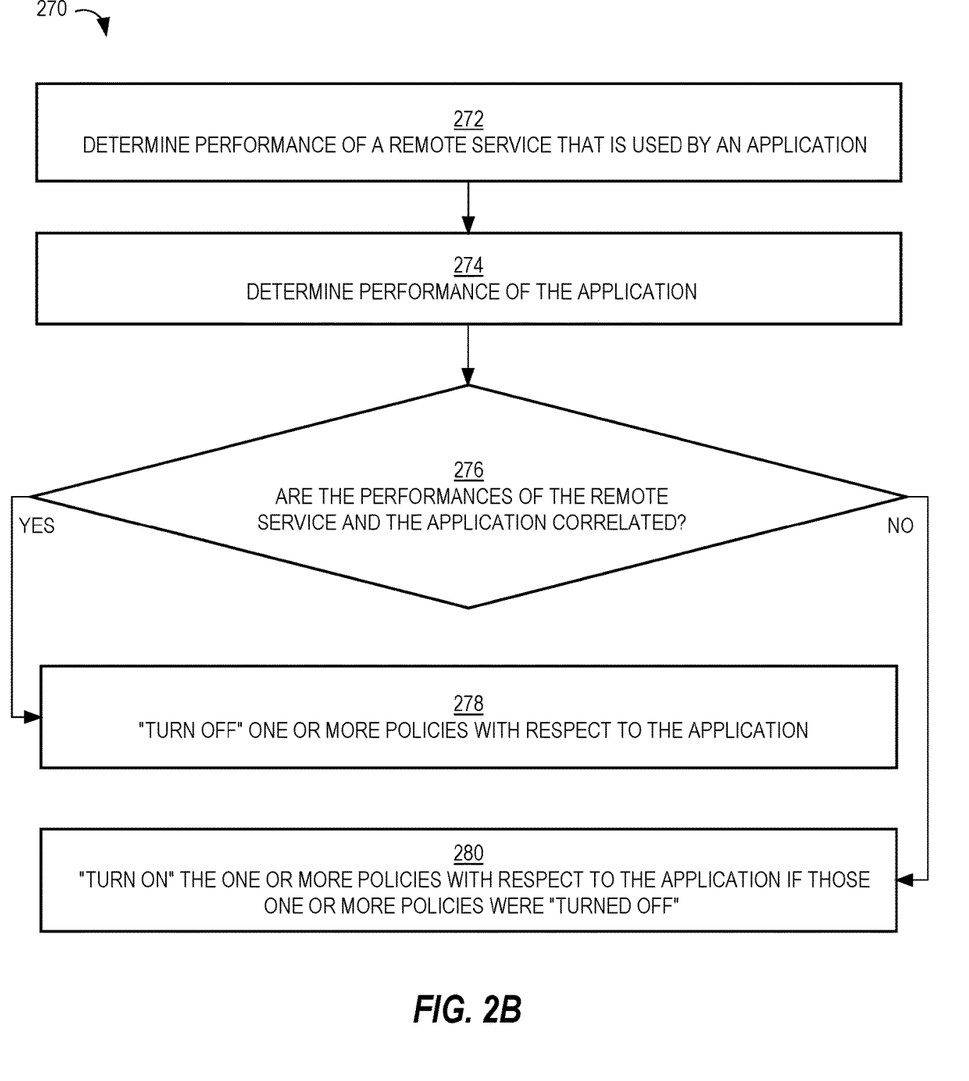
FIG. 2B is a flow diagram that depicts an example process 270 for taking into account performance of a remote service that is used by an application when determining which policies to consider, in an embodiment.

FIG. 2B is a flow diagram that depicts an example process 270 for taking into account performance of a remote service that is used by an application when determining which policies to consider, in an embodiment. Process 270 may precede block 230 in FIG. 2A or be part of block 230. For example, a policy that would have normally been considered based on priority order is no longer considered, at least until a certain determination is made in block 276.

At block 272, performance of a remote service that is being used by an application is determined. Any measure of performance as described herein may be used.

At block 274, performance of the application is determined. Any measure of performance of the application may be used, such as latency, QPS, errors, and/or resource utilization measures.

At block 276, it is determined whether the respective performances are correlated. For example, if a significant degradation of performance of the remote service immediately preceded by a significant degradation of performance of the application and the poor performance of both are sustained over a certain period of time (e.g., a few minutes), then it is likely that the performances of the remote service and the application are correlated.

At block 278, one or more policies are "turned off" with respect to the application. Block 278 may involve turning off all policies with respect to the application or only certain policies. For example, the policies that are turned off are ones that pertain to one or more particular types of computer resources.

Block 278 may involve storing off data that associates the one or more policies with the application and indicates that policy engine 124 should not consider the one or more policies when determining which policy to consider next for the application. If off data is already stored for the one or more policies with respect to the application, then block 278 may involve just checking the off data and, optionally, generating a record indicating the event.

At block 280, one or more policies are "turned on" with respect to the application. Block 280 may involve turning on all policies with respect to the application or only certain policies. For example, the policies that are turned on are ones that pertain to one or more particular types of computer resources.

If off data is already stored for the one or more policies with respect to the application, then block 280 may involve deleting the off data and, optionally, generating a record indicating the deletion. If off data is not already stored, then block 280 may involve just checking whether there is off data and proceeding to block 230 of FIG. 2A.

Time Windows

In an embodiment, each of one or more policies is associated with a time window. A time window indicates a period of time during which the corresponding policy is not considered (or the initiation criteria of the policy is not considered). Instead, during that period of time, data collector 122 may continue to obtain performance-related data with respect to different types of computer resources. For example, if a policy is associated with a time window of 30 minutes and the beginning of the time period is at time T1 and the ending of the time period is at time T3, and the policy is selected at time T2 (which is between T1 and T3), then policy engine 124 determines that T2 is before T3 and, consequently, determines to not consider the initiation criteria of the policy.

In an embodiment where multiple policies are associated with time windows, the time windows from one policy to another may be the same or may be different. For example, the time window of each succeeding policy after P1 (the highest priority policy) might be no shorter than the time window of a preceding policy in priority order. As a specific example, policy P1 is associated with a time window of one minute, policy P2 is associated with a time window of two minutes, policy P3 is associated with a time window of two minutes, and policy P4 is associated with a time window of thirty minutes.

Resetting Time Windows

After a current time is past the time window of a policy, then the policy is a candidate for consideration. In an embodiment, a time window of a policy resets in response to determining that an action associated with the policy is to be performed. For example, initiation criteria associated with policy P2 are satisfied and, consequently, action A2 of policy P2 is performed. Time T2 is a time when it was determined that the initiation criteria were satisfied or when action A2 completed. The time window of policy P2 is reset to begin at T2 and end a time T3 that is based on the sum of the time window (e.g., two minutes) and time T2. Therefore, policy P2 is not a candidate for consideration until the current time is at or after time T3.

In an embodiment, in response to an action of a particular policy being triggered or performed, the time window of any policy that succeeds the particular policy in priority order is reset. For example, an action of policy P3 is performed. In response, a time window of each of policies P3-P8 is reset, regardless of whether the time window was already past.

In the embodiment where the time window of each succeeding policy is no shorter than a preceding policy in priority order and the time window of each succeeding policy after a particular policy resets when an action of the particular policy is performed, if policy engine 124 determines that a particular policy should not be considered because the current time is within the time window of the particular policy, then policy engine 124 may avoid considering any of the succeeding policies, since the current time would be within their respective time windows. Thus, policy engine 124 may return to considering the highest priority policy (e.g., policy P1) at a future time.

Scale Down

Scale down policies work similar to scale up policies and aim to reclaim resources from applications without impacting their performance characteristics. Scale down policies aim to avoid relying on remedial actions issued through processing scale-up policies, and hence avoid oscillations due to repeated successive scale-down and scale-up actions. Similarly, scale down policies may minimize the number of scale down resize actions to reduce sizing time by avoiding the use of additive decrease strategies, such as decreasing a current resource allocation by a fixed amount (e.g., 10%) each time. Instead, in an embodiment, policy engine 124 determines what action would be safe based on current resource utilization data. For example, if policy engine 124 determines that the one or more initiation criteria associated with policy P6 for a particular application are satisfied and the particular application is currently using 6 GB of memory, then the resize action is to reduce memory allocation for the particular application based on that current allocation, such as reducing the memory allocation to an amount that is 10% greater than the current memory allocation.

Heap Scale Down

Reclaiming heap allocation presents a memory-CPU tradeoff. Choosing a relatively low value for heap memory causes frequent garbage collection and, consequently, increased CPU use, and can increase latencies beyond application requirements. Therefore, in an embodiment where heap is a computer resource, to scale down heap allocation with a single safe resize action, resize controller 120 relies on a heap-committed metric. This metric is published by a Java virtual machine (JVM) and measures the amount of heap allocated by the JVM to account for live objects and additional space for bookkeeping and anticipated future garbage collection. Thus, if the amount of heap used by an application is 3 GB, the amount of heap committed is 4 GB, and the current heap application to the application is 10 GB, then reducing the heap allocation to 3.5 GB would cause the application to increase its CPU utilization. An example of a rule for scaling down heap allocation for an application in response to determining to perform a resize action is a certain percentage (e.g., 5) greater than the current heap committed metric. By bounding the heap allocation using the heap-committed metric, a safe scale down heap policy minimizes the impact of scale down resize actions on an application's existing characteristics and minimizes requiring remedial actions at the cost of over allocation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
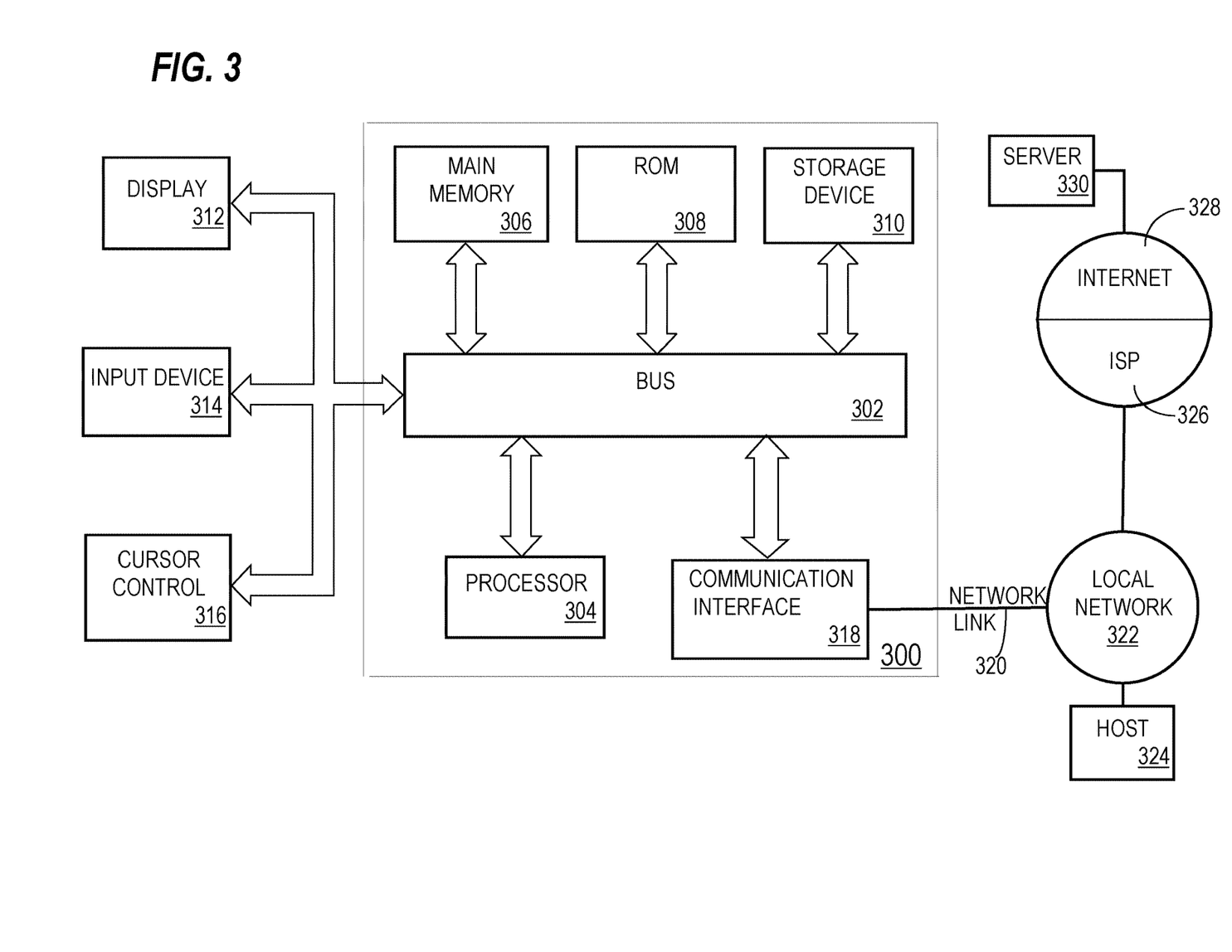
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing policy data that indicates an order of a plurality of policies, wherein the plurality of policies includes (1) a first policy that corresponds to a first computer resource and a first resizing action and (2) a second policy that is lower in priority than the first policy and that corresponds to a second resizing action and a second computer resource that is different than the first computer resource, wherein the first computer resource is one or more central processing units (CPUs) and the second computer resource is parallelism;

after storing the policy data, receiving computer resource utilization data from at least one application of a plurality of applications executing in a cloud environment;

based on the order indicated in the policy data, identifying the first policy;

based on a first portion of the computer resource utilization data, determining whether one or more first criteria associated with the first policy are satisfied with respect to the application;

if the one or more first criteria are satisfied, then causing the first resizing action to be performed with respect to the application and the first computer resource and not considering the second policy;

if the one or more first criteria are not satisfied, then determining, based on a second portion of the computer resource utilization data, whether one or more second criteria associated with the second policy are satisfied with respect to the application;

wherein the method is performed by one or more computing devices.

2. The method of claim 1, further comprising:
storing time window data that indicates, for each policy of the plurality of policies, a time window that indicates when said each policy is not considered for determining whether one or more criteria associated with said each policy is satisfied;

prior to determining whether the one or more first criteria associated with the first policy are satisfied based on the computer resource utilization data:
determining a current time;
identifying, from the time window data, a first time window that is associated with the first policy;
determining whether one or more first criteria associated with the first policy are satisfied based on the computer resource utilization data only after determining that the current time is not within the first time window.

3. The method of claim 2, wherein the time window for each subsequent policy, in the plurality of policies, to the first policy is no shorter than the time window associated with an immediately previous policy in the plurality of policies.

4. The method of claim 2, further comprising:
in response to determining that the one or more first criteria are satisfied, updating the time window for each policy of the plurality of policies.

5. The method of claim 1, wherein the computer resource utilization data comprises (a) a checkpoint in a log file that indicates first data that a particular application has processed and (b) buffer data that indicates second data that is buffered for the particular application, the method further comprising:
based on the checkpoint and the buffer data, determining a number of inputs between the first data and the second data;
based on the number of inputs, determining whether to increase or decrease parallelism of the particular application.

6. The method of claim 1, further comprising:
based on the computer resource utilization data, determining whether one or more third criteria associated with a third policy are satisfied with respect to the application, wherein the third policy corresponds to heap memory and is associated with a scale down action;

wherein determining whether the one or more third criteria are satisfied comprises determining an amount of heap memory that is committed for the application, wherein the amount of heap memory that is committed is greater than the amount of heap memory that is used for the application.

7. The method of claim 1, further comprising:
based on the computer resource utilization data, determining to increase parallelism of the application;
in response to determining to increase parallelism of the application:
determining whether a maximum thread threshold would be reached if an additional thread count is added to a current thread count for the application;
in response to determining that the maximum thread threshold would be reached, causing a new instance of the application to execute in the cloud environment.

8. The method of claim 1, wherein the first computer resource is heap memory and the second computer resource is non-heap memory.

9. The method of claim 1, further comprising, in response to determining that the one or more first criteria are satisfied:
identifying a plurality of feature values associated with the application or the first computer resource;
inputting the plurality of feature values into a machine-learned model that has been trained based on a plurality of features using one or more machine learning techniques, wherein the machine-learned model generates an output;
wherein the first resizing action is associated with an amount of resizing the first computer resource, wherein the amount of resizing is based on the output.

10. The method of claim 1, wherein:
the plurality of policies includes multiple policies that are lower in the order than the first and second policies;
the last policy, in the plurality of policies based on the order, is only considered after determining that one or more initiation criteria associated with each policy, in the plurality of policies previous to the last policy, are not satisfied.

11. One or more storage media storing instructions which, when executed by one or more processors, cause:
storing policy data that indicates an order of a plurality of policies, wherein the plurality of policies includes (1) a first policy that corresponds to a first computer resource and a first resizing action and (2) a second policy that is lower in priority than the first policy and that corresponds to a second resizing action and a second computer resource that is different than the first computer resource, wherein the first computer resource is one or more central processing units (CPUs) and the second computer resource is parallelism;
after storing the policy data, receiving computer resource utilization data from at least one application of a plurality of applications executing in a cloud environment;
based on the order indicated in the policy data, identifying the first policy;
based on a first portion of the computer resource utilization data, determining whether one or more first criteria associated with the first policy are satisfied with respect to the application;

if the one or more first criteria are satisfied, then causing the first resizing action to be performed with respect to the application and the first computer resource and not considering the second policy;

if the one or more first criteria are not satisfied, then determining, based on a second portion of the computer resource utilization data, whether one or more second criteria associated with the second policy are satisfied with respect to the application.

12. The one or more storage media of claim 11, wherein the instructions, when executed by the one or more processors, further cause:

storing time window data that indicates, for each policy of the plurality of policies, a time window that indicates when said each policy is not considered for determining whether one or more criteria associated with said each policy is satisfied;

prior to determining whether the one or more first criteria associated with the first policy are satisfied based on the computer resource utilization data:
determining a current time;
identifying, from the time window data, a first time window that is associated with the first policy;
determining whether one or more first criteria associated with the first policy are satisfied based on the computer resource utilization data only after determining that the current time is not within the first time window.

13. The one or more storage media of claim 12, wherein the time window for each subsequent policy, in the plurality of policies, to the first policy is no shorter than the time window associated with an immediately previous policy in the plurality of policies.

14. The one or more storage media of claim 12, wherein the instructions, when executed by the one or more processors, further cause:
in response to determining that the one or more first criteria are satisfied, updating the time window for each policy of the plurality of policies.

15. The one or more storage media of claim 11, wherein the computer resource utilization data comprises (a) a checkpoint in a log file that indicates first data that a particular application has processed and (b) buffer data that indicates second data that is buffered for the particular application, wherein the instructions, when executed by the one or more processors, further cause:
based on the checkpoint and the buffer data, determining a number of inputs between the first data and the second data;
based on the number of inputs, determining whether to increase or decrease parallelism of the particular application.

16. The one or more storage media of claim 11, wherein the instructions, when executed by the one or more processors, further cause:
based on the computer resource utilization data, determining to increase parallelism of the application;
in response to determining to increase parallelism of the application:
determining whether a maximum thread threshold would be reached if an additional thread count is added to a current thread count for the application;
in response to determining that the maximum thread threshold would be reached, causing a new instance of the application to execute in the cloud environment.

17. A system comprising:
at least one memory; and
at least one processor;
wherein the at least one memory comprises instructions that, when executed by the at least one processor perform operations comprising:
storing policy data that indicates an order of a plurality of policies, wherein the plurality of policies includes (1) a first policy that corresponds to a first computer resource and a first resizing action and (2) a second policy that is lower in priority than the first policy and that corresponds to a second resizing action and a second computer resource that is different than the first computer resource, wherein the first computer resource is one or more central processing units (CPUs) and the second computer resource is parallelism;
after storing the policy data, receiving computer resource utilization data from at least one application of a plurality of applications executing in a cloud environment;
based on the order indicated in the policy data, identifying the first policy;
based on a first portion of the computer resource utilization data, determining whether one or more first criteria associated with the first policy are satisfied with respect to the application;
if the one or more first criteria are satisfied, then causing the first resizing action to be performed with respect to the application and the first computer resource and not considering the second policy;
if the one or more first criteria are not satisfied, then determining, based on a second portion of the computer resource utilization data, whether one or more second criteria associated with the second policy are satisfied with respect to the application.

* * * * *